(12) United States Patent
Yeung et al.

(10) Patent No.: US 11,829,756 B1
(45) Date of Patent: Nov. 28, 2023

(54) VECTOR CUMULATIVE SUM INSTRUCTION AND CIRCUIT FOR IMPLEMENTING FILTERING OPERATIONS

(71) Applicant: Apple Inc., Cupertino, CA (US)

(72) Inventors: On Wa Yeung, San Diego, CA (US); Seydou N. Ba, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 17/448,871

(22) Filed: Sep. 24, 2021

(51) Int. Cl.
*G06F 9/30* (2018.01)
*G06F 9/38* (2018.01)
*G06F 9/22* (2006.01)

(52) U.S. Cl.
CPC ........ *G06F 9/30036* (2013.01); *G06F 9/3001* (2013.01); *G06F 9/30101* (2013.01); *G06F 9/3887* (2013.01); *G06F 9/226* (2013.01)

(58) Field of Classification Search
None
See application file for complete search history.

(56) References Cited

U.S. PATENT DOCUMENTS

| | | | |
|---|---|---|---|
| 6,131,108 A | 10/2000 | Born et al. | |
| 6,295,597 B1 * | 9/2001 | Resnick | G06F 15/8076 712/8 |
| 8,009,872 B2 | 8/2011 | Kurata | |
| 8,199,907 B2 | 6/2012 | Takada | |
| 9,697,599 B2 | 7/2017 | Prasad et al. | |
| 2014/0280407 A1 * | 9/2014 | Khan | G06F 9/3887 708/203 |
| 2015/0039665 A1 * | 2/2015 | Burgess | G06F 7/506 708/551 |
| 2020/0319885 A1 * | 10/2020 | Eyole | G06F 7/50 |

* cited by examiner

*Primary Examiner* — John M Lindlof
(74) *Attorney, Agent, or Firm* — KILPATRICK TOWNSEND & STOCKTON LLP

(57) ABSTRACT

A vector cumulative sum circuit can include a set of input registers, a carry-forward data source, a set of output registers, and a network of adder circuits coupling the input registers to the output registers such that the output value in a given output register is the sum of a value provided by the carry-forward data source and the input values from all of the input registers (in logical order) up to (and including) the corresponding input register. The value in the last output register can be carried forward to enable cumulative summing of a larger number of input values. The vector cumulative sum circuit can be implemented in a programmable processor, and a vector cumulative sum instruction can be defined in the instruction set. Using the vector cumulative sum circuit and instruction, filtering operations can be accelerated.

20 Claims, 7 Drawing Sheets

VECTOR CUMULATIVE SUM INSTRUCTION AND CIRCUIT FOR IMPLEMENTING FILTERING OPERATIONS

BACKGROUND

This disclosure relates generally to vector microprocessors and in particular to a vector cumulative sum instruction and associated circuit for implementing filtering operations.

Filtering operations are fundamental to digital signal processing (DSP). For example, the moving average filter is widely used to reduce noise by smoothing the signal and for other purposes. For high-throughput signal processing operations, efficient implementations of filtering operations are desirable.

SUMMARY

According to some embodiments, a vector cumulative sum circuit is provided. A vector cumulative sum circuit can include a set of input registers having a logical order from first to last, a carry-forward data source, a set of output registers each corresponding to one of the input registers, and a network of adder circuits coupling the input registers to the output registers. The network of adder circuits can be configured such that the output value in a given output register is the sum of a carry-forward value provided by the carry-forward data source and the input values from all of the input registers (in logical order) up to (and including) the corresponding input register. The value in the last output register can be carried forward to enable cumulative summing of a number of inputs that exceeds the number of input (or output) registers. The vector cumulative sum circuit can be implemented in a microprocessor or other programmable digital signal processing circuit, and a vector cumulative sum instruction can be defined in the instruction set to invoke operation of the vector cumulative sum circuit. In various embodiments, the vector cumulative sum circuit and corresponding instruction can be used to accelerate computation of various filter functions.

Some embodiments relate to a vector cumulative sum circuit that can include: a set of input registers having a logical order from a first input register to a last input register; a set of output registers having a logical order from a first output register to a last output register, wherein different ones of the output registers correspond to different ones of the input registers; a carry-forward data source configured to provide a carry-forward data value; and a network of adder circuits coupled between the input registers and the output registers and configured such that a given one of the output registers receives a value equal to a sum of the carry-forward data value and respective values from each of the input registers in the logical order from the first input register through the input register that corresponds to the given one of the output registers. The vector cumulative sum circuit is configured to receive respective input values into the input registers concurrently and to output respective output values from the output registers concurrently.

In some embodiments, a data transfer path can be coupled between the last output register and the carry-forward data source.

In some embodiments, the carry-forward data source can include an initialization register and a multiplexer having a first input coupled to the initialization register and a second input coupled to the last output register. The multiplexer can be configured to select one of the first input or the second input as the carry-forward data value.

In some embodiments, a vector cumulative sum circuit can be configured to operate in response to a set of one or more instructions. The set of one or more instructions can include, for example, an initialization instruction to provide an initialization value to the carry-forward data source and a vector cumulative sum instruction to operate the network of adder circuits and to provide the output value from the last output register to the carry-forward data source. In some embodiments, the carry-forward data source can include a logic circuit configured such that the initialization value is provided as the carry-forward data value during a first execution of the vector cumulative sum instruction following an execution of the initialization instruction and such that the output value provided from the last output register is provided as the carry-forward data value during each subsequent execution of the vector cumulative sum instruction until another initialization instruction is executed.

In some embodiments, the number (L) of input registers is equal to the number of output registers, and the network of adder circuits includes the number L of adder circuits. In other embodiments, the network of adder circuits can include more than L adder circuits, and the adder circuits can be arranged such that a critical path of the network of adder circuits includes fewer than L adder circuits.

Some embodiments relate to a microprocessor that can include a vector arithmetic logic circuit operable to compute a vector difference between two vectors and a vector cumulative sum circuit. The vector cumulative sum circuit can include: a set of input registers having a logical order from a first input register to a last input register; a set of output registers having a logical order from a first output register to a last output register, wherein different ones of the output registers correspond to different ones of the input registers; a carry-forward data source configured to provide a carry-forward data value; and a network of adder circuits coupled between the input registers and the output registers and configured such that a given one of the output registers receives a value equal to a sum of the carry-forward data value and respective values from each of the input registers in the logical order from the first input register through the input register that corresponds to the given one of the output registers. The vector cumulative sum circuit is configured to receive respective input values into the input registers concurrently and to output respective output values from the output registers concurrently. An instruction set of the microprocessor can include a vector cumulative sum instruction that causes the vector cumulative sum circuit to operate the network of adder circuits.

In some embodiments, the carry-forward data source can include an initialization register and a multiplexer having a first input coupled to the initialization register and a second input coupled to the last output register. The multiplexer can be configured to select one of the first input or the second input as the carry-forward data value. In some embodiments, the instruction set of the microprocessor can also include an initialization instruction that causes the vector cumulative sum circuit to load an initialization value into the initialization register and to set the multiplexer to a state that selects the first input as the carry-forward data value. In some embodiments, the vector cumulative sum instruction can also set the multiplexer to a state that selects the second input as the carry-forward data value after operating the network of adder circuits.

In some embodiments, the microprocessor can be configured for single-instruction multiple-data (SIMD) execution of instructions across a number (L) of parallel lane, and the set of input registers and the set of output registers can each include L registers.

In some embodiments, the number (L) of input registers is equal to the number of output registers, and the network of adder circuits includes the number L of adder circuits. In other embodiments, the network of adder circuits can include more than L adder circuits, and the adder circuits can be arranged such that a critical path of the network of adder circuits includes fewer than L adder circuits.

In some embodiments, the microprocessor can be configured to compute a moving-average filter for a set of input samples by executing a vector difference instruction in the vector arithmetic logic circuit followed by the vector cumulative sum instruction in the vector cumulative sum circuit.

In some embodiments, microprocessor can be configured to compute a $sinc^k$ filter having an order k for a set of input samples by executing a vector difference instruction in the vector arithmetic logic circuit followed by iteratively executing the vector cumulative sum instruction in the vector cumulative sum circuit for a number of iterations equal to the order k.

In some embodiments, the microprocessor can be configured to compute an integral of a function defined by a set of input samples by executing the vector cumulative sum instruction.

Some embodiments relate to a method that can include: receiving, in a microprocessor, an input data set to be filtered; and executing, by the microprocessor, a sequence of instructions to filter the input data set. Executing the sequence of instructions can include: executing, using a vector arithmetic logic unit of the microprocessor, a vector difference instruction on two input vectors selected from the input data set; and executing a vector cumulative sum instruction using a vector cumulative sum circuit that includes a set of input registers having a logical order from a first input register to a last input register; a set of output registers having a logical order from a first output register to a last output register, wherein different ones of the output registers correspond to different ones of the input registers; a carry-forward data source configured to provide a carry-forward data value; and a network of adder circuits coupled between the input registers and the output registers and configured such that a given one of the output registers receives a value equal to a sum of the carry-forward data value and respective values from each of the input registers in the logical order from the first input register through the input register that corresponds to the given one of the output registers, wherein a vector output of executing the vector difference instruction is loaded into the input registers of the vector cumulative sum circuit. The method can also include using the values received in the output registers as a moving average of the input data set.

In some embodiments, execution of the vector difference instruction and execution of the vector cumulative sum instruction can be repeated for successive portions of the input data set, and for the repeated executions of the vector cumulative sum instruction, the carry-forward data value can be a value received at the last output register during an immediately preceding execution.

In some embodiments, prior to a first execution of the vector cumulative sum instruction, an initialization instruction can be executed that loads an initialization value into the carry-forward data source.

The following detailed description, together with the accompanying drawings, will provide a better understanding of the nature and advantages of the claimed subject matter.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
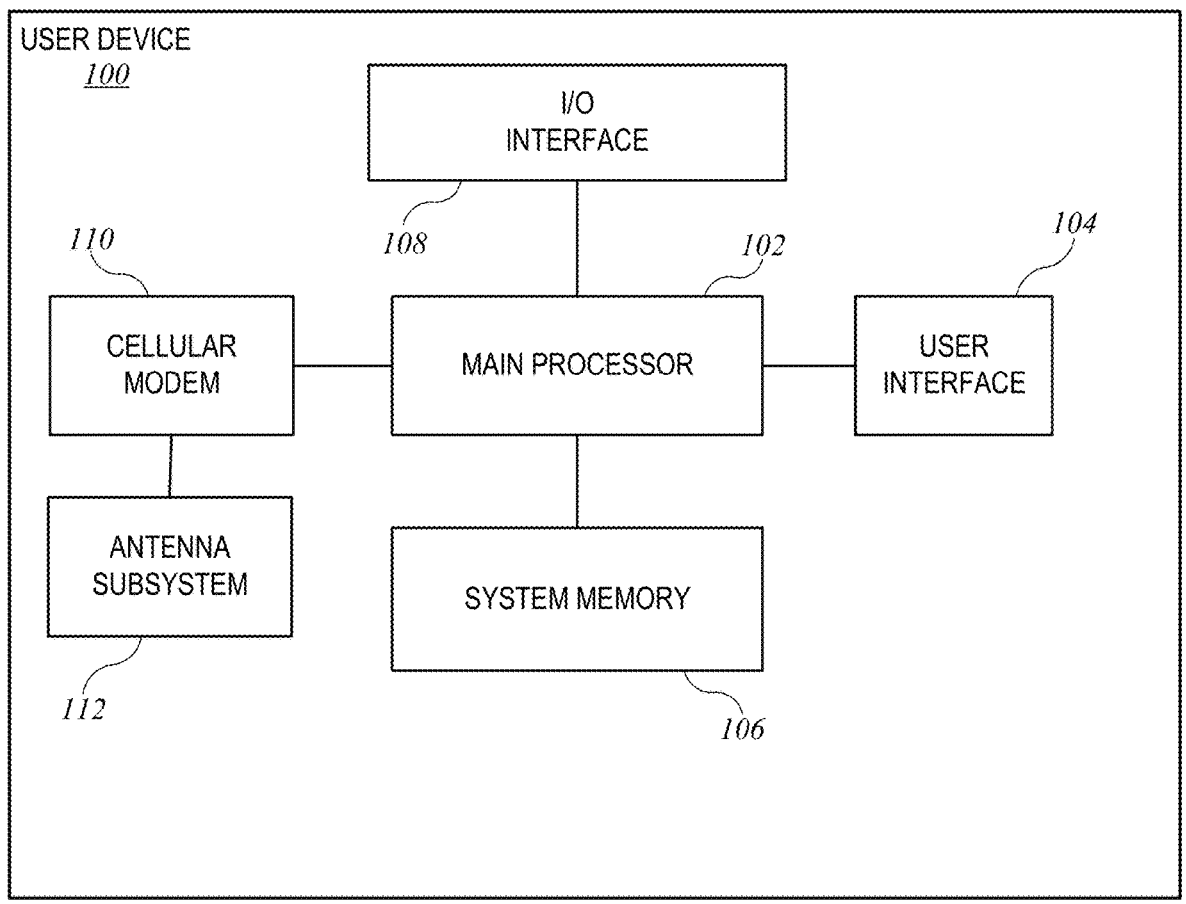
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio area network. User device 100 is representative of a broad class of user-operable devices that may incorporate a cellular modem as described herein, and such devices can vary widely in capability, complexity, and form factor.

Main processor 102 can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user device 100 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. In some embodiments, cellular modem 110 can support cellular data communication according to standards promulgated by the 3rd Generation Partnership Project (3GPP) to enable radio-frequency communication between a base station (typically implemented at a cellular antenna tower) and various user equipment (UE), which can include user device 100, via an "uplink" from the UE to the base station and a "downlink" from the base station to the UE. Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels. At a high level, for any of these channels, data to be transmitted is encoded in the frequency domain, then transformed to time domain using an inverse FFT (IFFT) for transmission on the radio channel; the receiver reverses the process by performing an FFT on the received time-domain signal, then decoding the data in the frequency domain. The particular encoding and decoding operations may differ from channel to channel and between 4G and 5G. Processing of digital signals can include filtering in the time domain and/or the frequency domain. As just one example among many, a moving average filter can be applied in the time domain to reduce noise in the digital signal.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum 20 bands, including bands at 700 MHz, 850 MHz, 900 MHz, 1.5 GHz, 1.8 GHz, 2.1 GHz, 2.5 GHz and 3.5 GHz. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
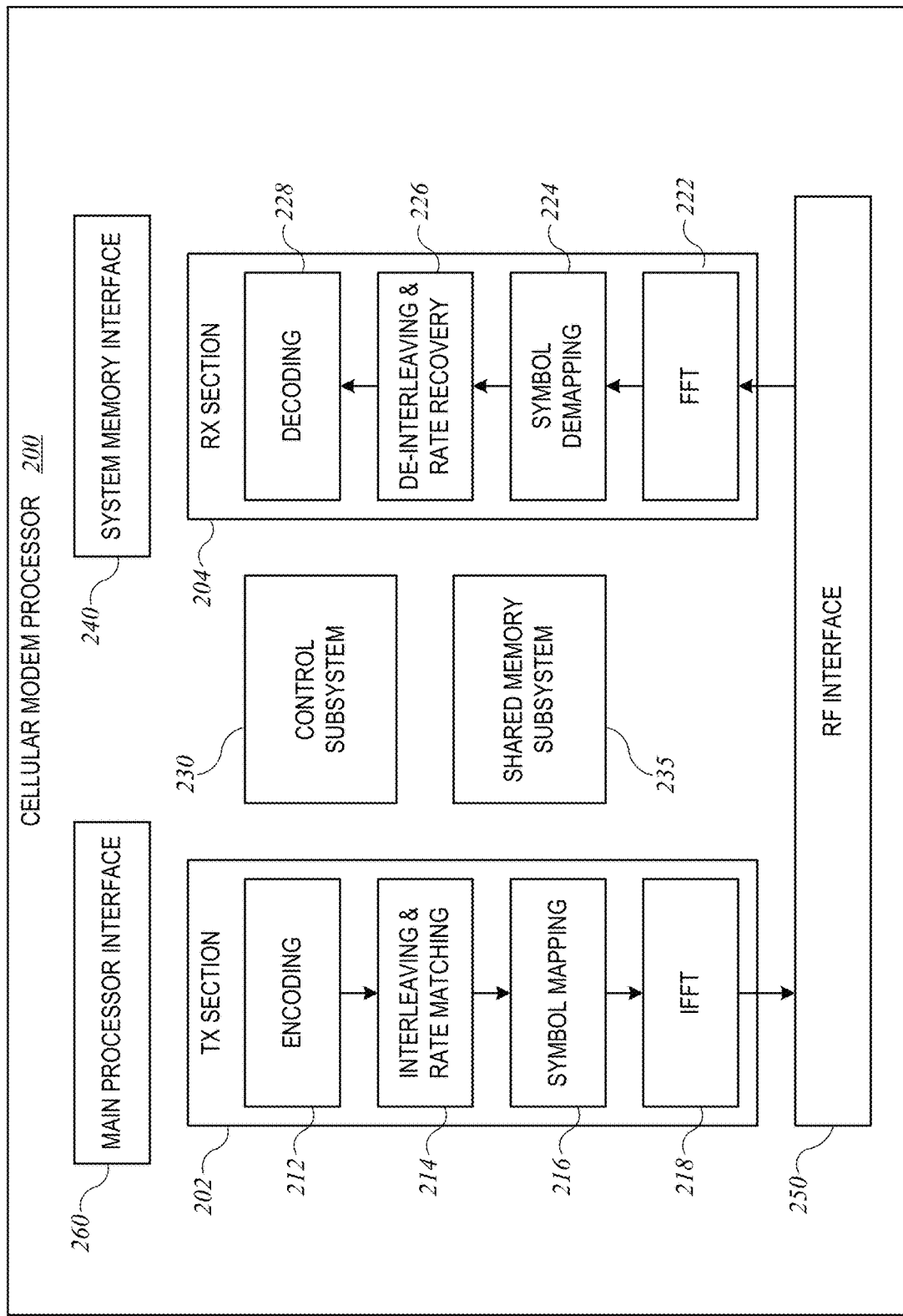
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Cellular modem processor 200 can include a transmit (TX) section 202 and a receive (RX) section 204. TX section 202 can include one or more data processing pipelines to prepare data for transmission via antenna subsystem 110, and RX section 204 can include one or more data processing pipelines to reconstruct transmitted data from signals received via antenna subsystem 110. Cellular modem processor 200 can also include a control subsystem 230, a shared memory subsystem 235 and various interfaces to other system components, such as a system memory interface 240, an RF interface 250, and a main processor interface 260.

Data processing pipelines in TX section 202 and RX section 204 can include logic circuitry (e.g., any combination of fixed-function and/or programmable circuitry) that implements a specific sequence of operations and associated storage circuitry (e.g., registers, data buffers, and/or other memory circuits) to store data being operated on. The operations can conform to the specifications of a particular cellular data network, including 4G and/or 5G networks. For example, shown in TX section 202 are an encoding unit 212, an interleaving and rate-matching unit 214, a symbol mapping unit 216, and an inverse Fast Fourier Transform (IFFT) unit 218. Encoding unit 212 can perform code block segmentation and channel coding for a particular channel (e.g., for PUCCH or PUSCH). The encoding operations can be specific to a particular channel and/or a particular communication standard. For instance, 4G PUSCH channel coding operations can include CRC (cyclic redundancy check) calculation and Turbo coding; 4G PUCCH channel coding operations can include CRC calculation and convolutional coding; 5G PUSCH channel coding operations can include CRC calculation and low-density parity check (LDPC) coding; and 5G PUCCH channel coding operations can include CRC calculation and polar coding. Interleaving and rate-matching unit 214 can perform interleaving and rate matching operations on encoded code blocks. As with encoding operations, interleaving and rate matching operations can depend on the particular channel and/or particular communication standard. For instance, in 4G PUSCH, interleaving precedes rate matching, while 5G PUSCH reverses the order. Symbol mapping unit 216 can receive bit sequences for code blocks after encoding, rate-matching and interleaving and can map the bit sequences onto symbols in an appropriate constellation for each of a set of orthogonal frequency division multiplexing (OFDM) subcarriers. Again, the mapping can depend on the particular channel and/or communication standard. Due to such differences, dedicated hardware pipelines can be constructed to support different physical channels (e.g., PUSCH vs. PUCCH) and/or different communication standards (e.g., 4G vs. 5G), or multipurpose pipelines that share hardware can be constructed. IFFT unit 218 receives the symbols from symbol mapping unit 216. Each symbol can be, e.g., a complex number representing an amplitude and phase. IFFT unit 218 can perform an IFFT to transform the symbols to a sample sequence in the time domain. This sample sequence can be provided to RF interface 250.

RF interface 250 can be an interface to antenna subsystem 112 of FIG. 1 and can convert the sample sequence to an analog signal that is mixed onto the carrier frequency and transmitted via an antenna. RF interface 250 can also down-convert received RF signals to baseband and convert the baseband analog signal to a sequence of digital samples. Digital sample sequences can be provided to pipelines in RX section 204.

As with TX section 202, operations in RX section 204 can conform to the specifications of a particular cellular data network, including 4G and/or 5G networks. For example, shown in RX section 204 are a Fast Fourier Transform (FFT) unit 222, a symbol demapping unit 224, a de-interleaving and rate recovery unit 226, and a decoding unit 228. FFT unit 222 can receive, via RF interface 250, a sequence of samples representing a received (baseband) signal and can perform an FFT to transform the samples from time domain to frequency domain. Symbol demapping unit 224 can perform demapping and symbol-decoding operations to generate a representation of the bits that were transmitted. The decoding operation can be a soft decoding operation that produces log likelihood ratios (LLRs) or other estimates of the relative probability of a given bit being 0 or 1. De-interleaving and rate recovery unit 226 can reverse the interleaving and rate matching operations that were performed at the transmitter. Decoding unit 228 can perform channel decoding to decode the code blocks and recover the data. As with corresponding components in TX section 204, the operations implemented in demapping unit 224, de-interleaving and rate recovery unit 226, and decoding unit 228 can be specific to a particular channel and/or a particular communication standard. Due to such differences, dedicated hardware pipelines can be constructed to support different physical channels (e.g., PDSCH vs. PDCCH) and/or different communication standards (e.g., 4G vs. 5G), or multipurpose pipelines that share hardware can be constructed.

Operation of the pipelines in TX section 202 and RX section 204 can be coordinated by control subsystem 230. Control subsystem 230 can include circuitry to manage communication between units in TX section 202 and RX section 204 and other components of cellular modem processor 200 (e.g., RF interface 250, main processor interface 260, and system memory interface 240) and/or between cellular modem processor 200 and other components of a device or system (e.g., user device 100 of FIG. 1) in which cellular modem processor 200 operates. A variety of implementations can be used, including various combinations of fixed-function circuitry and programmable circuitry executing program code provided as firmware. Shared memory subsystem 235 can include memory circuits (e.g., SRAM, DRAM, or the like), a read interface and a write interface connected via crossbars to TX section 202 and RX section 204 (or to individual units in TX section 202 and/or RX section 204), and arbitration logic to manage multiple requests (e.g., using time division multiplexing or other techniques). In some embodiments, shared memory subsystem 235 can be implemented such that any unit in TX section 202 or RX section 204 can access any location in the shared memory. A variety of architectures, including conventional architectures, can be used. In some embodiments, shared memory subsystem 235 can be used to transfer data into and out of TX section 202 and/or RX section 204, or between units within TX section 202 and/or RX section 204.

Main processor interface 260 can enable communicating with main processor 102 (shown in FIG. 1), via an interface such as Advanced eXtensible Interface (AXI), which is part of ARM Advanced Microcontroller Bus Architecture, or any other suitable interface for communication between a main processor and a coprocessor. Other interfaces to other components of user device 100 can also be provided, such as a system memory interface 240 that provides a direct memory access (DMA) interface to transfer data between shared memory subsystem 235 and system memory 106 of FIG. 1.

It will be appreciated that cellular modem processor 200 is illustrative and that variations and modifications are possible. A cellular modem processor can include any number and combination of pipelines, supporting any number and combination of cellular data communication standards. Control subsystems, memory subsystems and interfaces to other components can be varied as desired. In some embodiments, cellular modem processor 200 can have a high throughput to support high-speed cellular networks (e.g., 12 Gbps for a 5G network).

In some embodiments, some or all of the data processing pipelines (e.g., pipelines in TX section 202 and/or RX section 204, as well as any other pipelines in cellular modem processor 200) can be single-instruction, multiple-data (SIMD) pipelines (also referred to as vector pipelines), which can increase throughput by processing data in a number (L) of parallel lanes. Pipelines can perform various digital signal processing operations, which can include filtering operations. For purposes of illustration, a moving average filter is used herein as an example. Those skilled in the art with access to the present disclosure will appreciate that circuits and methods as described herein can be used to accelerate computation for a variety of filters.

A moving average filter can be defined by the transfer function:

$$y[n] = \frac{1}{M_1} \sum_{m=0}^{M_1-1} x[m] h_1[n-m] \qquad (1)$$

where x[m] are the input samples, and the impulse response $h_1[m]$ is defined as:

$$h_1[m] = \begin{cases} 1, & 0 \le m < M_1 \\ 0, & m \ge M_1 \end{cases} \qquad (2)$$

In a conventional vector processor with L parallel lanes and an input set of N samples, computing Eq. (1) would take $(N \times M_1)/L$ cycles. Thus, throughput of a conventional vector processor computing Eq. (1) decreases with length.

According to some embodiments, higher throughput can be obtained by providing a vector cumulative sum circuit and associated instruction(s) that invoke(s) operation of the vector cumulative sum circuit.

Figure 3:
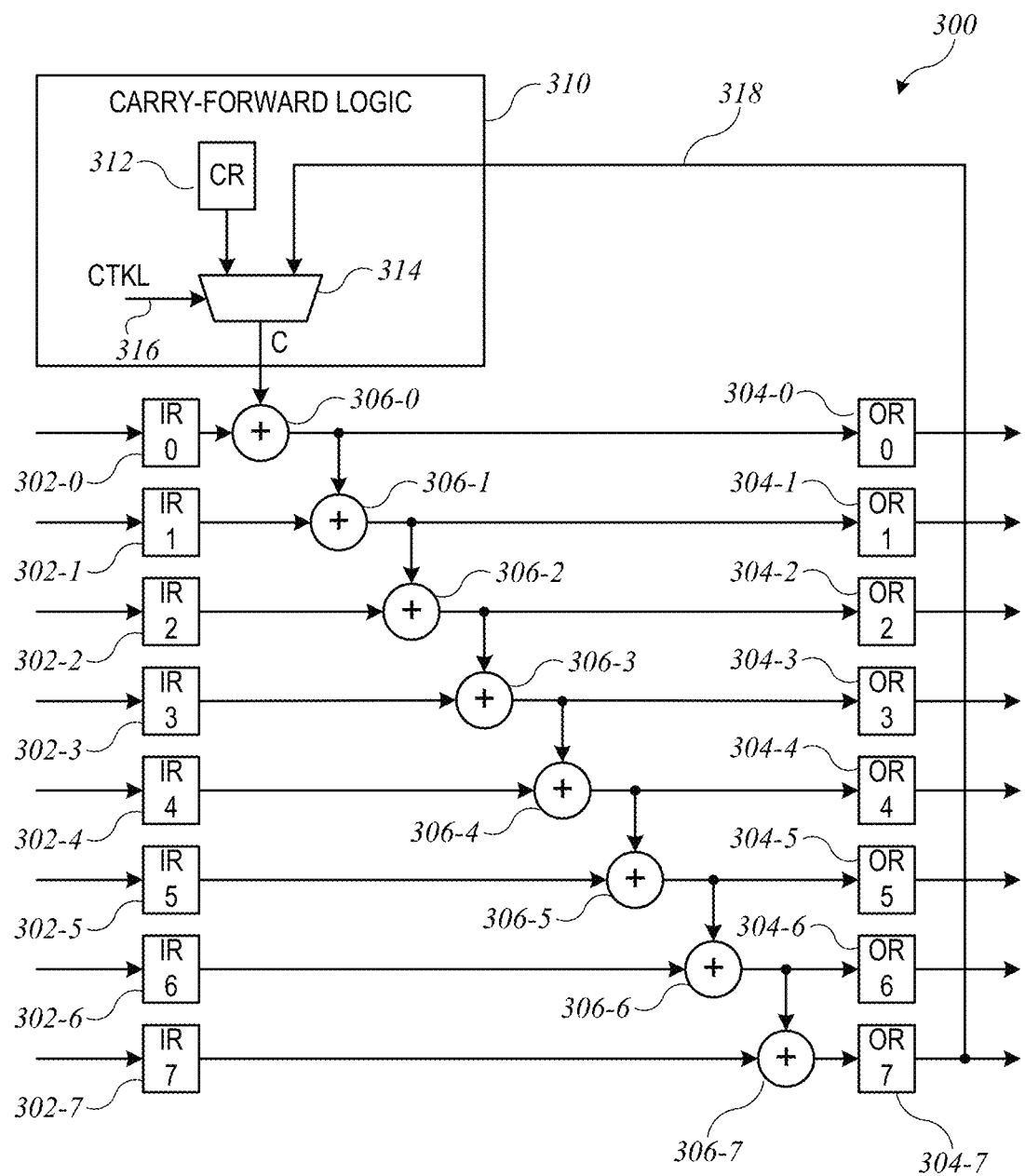
FIG. 3 shows a simplified schematic diagram of a vector cumulative sum circuit according to some embodiments.

FIG. 3 shows a simplified schematic diagram of a vector cumulative sum circuit 300 according to some embodiments. In this example, vector cumulative sum circuit 300 has eight lanes, although it should be understood that the number L of lanes can be varied. In some embodiments, the number of lanes in a vector cumulative sum circuit can match the number of SIMD lanes in other functional units of a processing pipeline or other microprocessor in which the vector cumulative sum circuit is included.

Vector cumulative sum circuit 300 includes a number L (in this example, L=8) of input registers 302-0 through 302-7 and an equal number L of output registers 304-0 through 304-7. Each input register 302 and each output register 304 can store a data value represented in a desired data format (e.g., floating-point or fixed-point, real or complex, 32-bit or 64-bit, etc.). It is assumed that all input registers 302 and all output registers 304 use the same data format. A network of adder circuits 306-0 through 306-7 is coupled between input registers 302 and output registers 304. Each adder circuit 306 can be any type of adder circuit, including a conventional adder circuit, and adder circuits 306 can operate on the same data format as input registers 302 and output registers 304. In this example, a first adder circuit 306-0 receives a first input from input register 302-0 and a second input from a carry-forward data source 310. Each other adder circuit 306-$i$ (for i=1, 2, ..., 7) receives one input from a corresponding input register 302-$i$ and one input from the output of the previous adder circuit 306-(i−1). Thus, each output register 304-$i$ receives a sum OR[i] given by:

$$OR[i] = C + \sum_{m=0}^{i} IR[m] \quad (3)$$

where C is an input provided by carry-forward data source 310 and IR[m] is the value in input register 302-$m$. Put differently, if the input registers are considered to have a logical order from a first input register (register 302-0) to a last input register (register 302-7), then each output register corresponds to one of the input registers, and each output register 304-$i$ receives an output value that is equal to a sum of the carry-forward value C and the input values from all of the input registers 302-$m$ from the first input register 302-0 through (i.e., up to and including) the input register 302-$i$ that corresponds to output register 304-$i$.

Carry-forward data source 310 can allow circuit 300 to compute a running sum across multiple operations. Carry-forward data source 310 includes an initialization register 312 and a multiplexer 314. One input of multiplexer 314 is coupled to initialization register 312, and the other input is coupled by a transfer path 318 to the last output register 304-7. In response to a control (CTL) signal 316, multiplexer 314 selects one or other of its two inputs to be provided as the carry-forward value C to first adder circuit 306-0. For instance, control signal 316 can have a "reset" state that selects the value CR from initialization register 312 and an "accumulate" state that selects the value OR[7] from last output register 304-7 (which was populated during the previous operation of circuit 300).

In operation, circuit 300 can first be initialized, e.g., in response to a "VCS_INIT" instruction as described below. Initialization can include storing an initialization value (CR) in initialization register 312. In some embodiments, the initialization value can be zero, but other values can also be used. Initialization can also include setting the control (CTL) signal 316 for multiplexer 314 to the "reset" state so that the value CR from initialization register 312 will be provided to first adder 306-0. After loading input values IR[0] to IR[7] into input registers 302-0 through, circuit 300 can operate adders 306-0 through 306-7 to generate the output values OR[0] to OR[7] for output registers 304-0 through 304-7, e.g., in response to a "VCUMSUM" instruction as described below. The output values from registers 304 can subsequently be moved to a memory location external to circuit 300, e.g., using an appropriate machine-level instruction. For instance, if circuit 300 is included in a pipeline in cellular modem processor 200 of FIG. 2, the external memory location can be, e.g., a location in shared memory subsystem 235. After generating the first sum in adder 306-0 (or after generating all L sums), circuit 300 can set the state of the signal 316 for multiplexer 314 to the "accumulate" state so that the value OR[7] from last output register 304-7 will be selected as the carry-forward input C in the next operation (unless circuit 300 is reinitialized). Since last output register 304-7 receives a running sum of all data values that have been previously input, circuit 300 can generate vector cumulative sums for an input data set of length N>L by repeating the load and add operations without also repeating the initialization instruction. To restart the cumulative sum for a new input data set, a new initialization operation can be performed.

Figure 4:
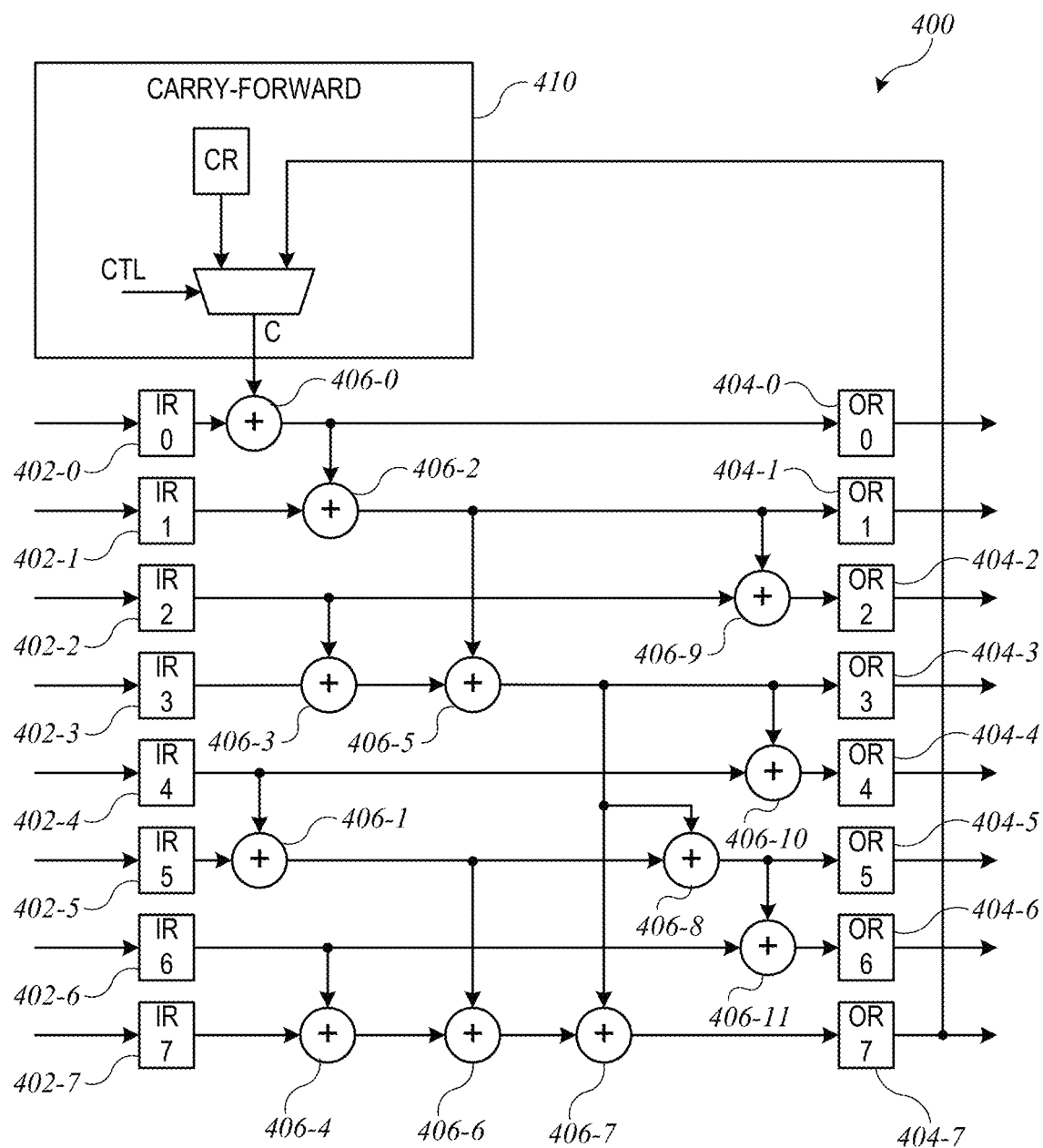
FIG. 4 shows a simplified schematic diagram of a vector cumulative sum circuit according to some embodiments.

Circuit 300 has a critical path (in this case the path that leads to last output register 304-7) that includes eight adder circuits 306. In some embodiments, the critical path of a vector cumulative sum circuit can be shortened by introducing additional adder circuits. FIG. 4 shows an example of a vector cumulative sum circuit 400 according to some embodiments. Like circuit 300, vector cumulative sum circuit 400 has eight lanes, although it should be understood that the number L of lanes can be varied, e.g., to match the number of SIMD lanes in other functional units of a pipeline or other microprocessor in which the vector cumulative sum circuit is included.

Vector cumulative sum circuit 400 includes a number L (in this example, L=8) of input registers 402-0 through 402-7 and a number L of output registers 404-0 through 404-7. Similarly to input registers 302 and output registers 304 of circuit 300, each input register 402 and each output register 404 can store a data value represented in a desired data format. A network of adder circuits 406-0 through 406-11 is coupled between input registers 402-0 through 402-7 and output registers 404-0 through 404-7. As with adder circuits 306, each adder circuit 406 can be any type of adder circuit, including a conventional adder circuit matched to the data format of input registers 402 and output registers 404. As in circuit 300, a carry-forward value C is provided by carry-forward data source 410, which can be similar or identical to carry-forward data source 310 of FIG. 3, allowing circuit 400 to compute a cumulative sum across larger input data sets. Adder circuits 406 are arranged such that each output register 404-$i$ receives a sum OR[i] given by Eq. (3) above. Thus, operation of circuit 400 can be identical to operation of circuit 300. In circuit 400, however, the critical path (which in this case is the path that leads to output register 404-6) includes five adder circuits rather than eight, so that circuit 400 can operate somewhat faster than circuit 300. The design tradeoff is a larger area for circuit 400 due to the larger number of adder circuits.

Circuits 300 and 400 are illustrative and can be modified as desired. A vector cumulative sum circuit can include a set of L input registers (e.g., registers 302 or registers 402) and a set of L output registers (e.g., registers 306 or registers 406), where the input registers and output registers are ordered from first to last (e.g., as illustrated by the index i associated with each register in the examples above). A network of adder circuits (e.g., adder circuits 306 or adder circuits 406) can be coupled between the input registers and the output registers such that each output register receives a value equal to a sum of a value provided by a carry-forward data source and respective values from all of the input registers from the first input register through (i.e., up to and including) the corresponding input register (in the examples above, these are the input registers for which the associated index is less than or equal to the associated index of the output register). The carry-forward data source can be configured to provide either an initialization value or a running sum carried forward from the last output register, allowing the circuit to compute cumulative sums for input data sets of length N>L. A variety of selection and storage circuits and associated control logic can be used to implement a carry-forward data source.

Figure 5:
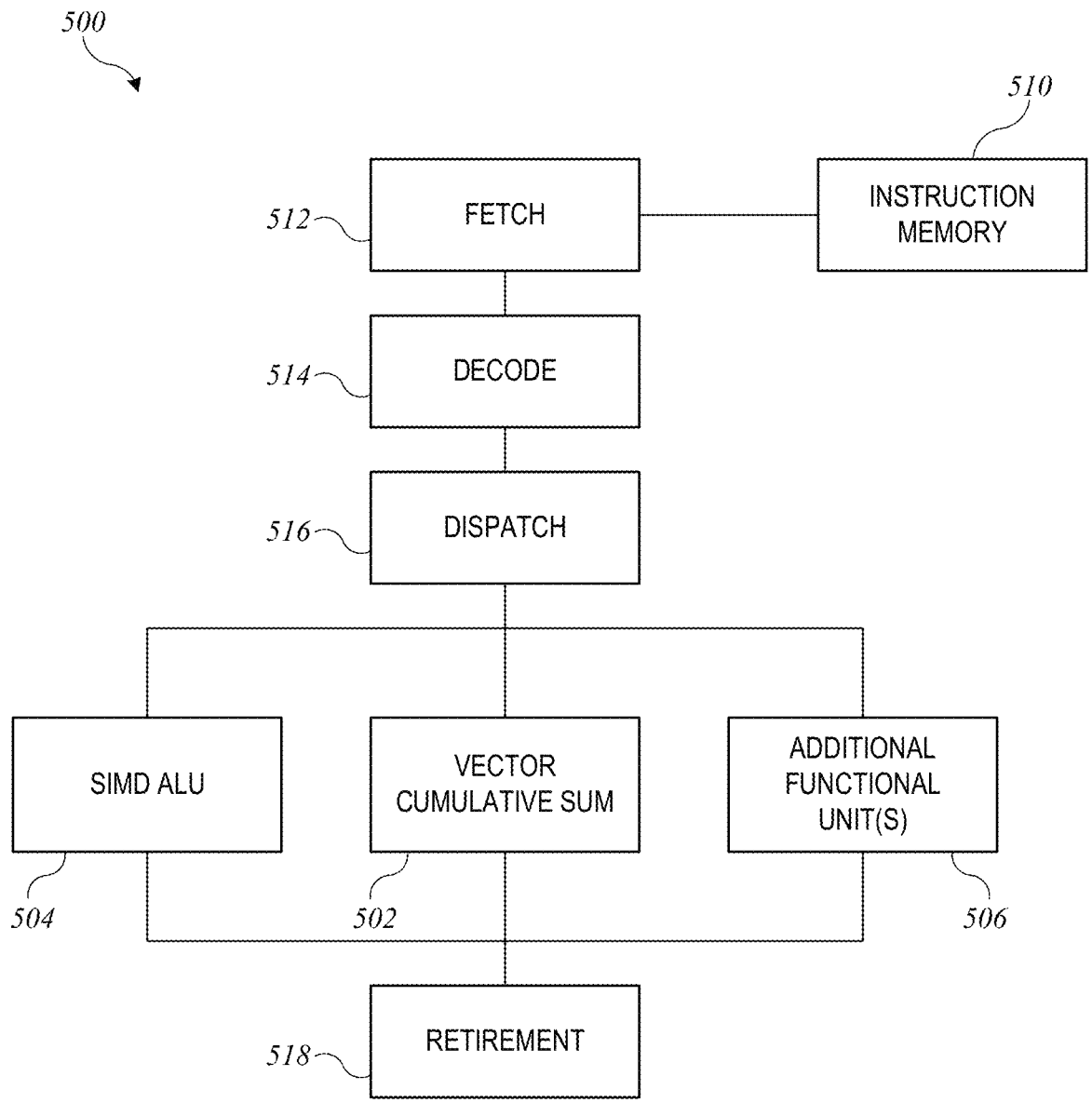
FIG. 5 shows a simplified block diagram of a microprocessor according to some embodiments.

In some embodiments, a vector cumulative sum circuit (e.g., circuit 300 or circuit 400) can be implemented as a functional unit in a microprocessor such as a programmable digital signal processor. FIG. 5 shows a simplified block diagram of a microprocessor 500 according to some embodiments. Microprocessor 500 can be a SIMD processor and can execute instructions in order or out-of-order as desired. Microprocessor 500 can include a set of functional units that execute various instructions. Examples of functional units include a vector cumulative sum unit 502, which can be implemented, e.g., using circuit 300 or circuit 400 described above. Other functional units can also be provided, such as a SIMD arithmetic logic unit (ALU) 504, which can implement vector operations such as vector addition, vector subtraction, vector negation, vector bitwise logic, and so on. In some embodiments, the number L of parallel lanes in SIMD ALU 504 can match the number of input registers (and output registers) in vector cumulative sum unit 502. Other functional units 506 can include, e.g., multipliers and/or special-purpose computation circuits, memory interface circuits that read data from and/or write data to external memory, and so on; some or all of functional units 506 can be SIMD functional units with L parallel lanes. Apart from aspects relevant to vector cumulative sum unit 502, components of microprocessor 500 can be generally conventional in design and operation. For example, an instruction memory 510 can include any memory circuit that stores program instructions to be executed by microprocessor 500. The instructions can be in machine-executable code and can be generated from program code written in a higher-level language. Fetch circuit 512 can fetch the instructions from instruction memory 510, generally in program order. In some embodiments, fetch circuit 512 can incorporate branch prediction, speculative fetch, and/or other optimizations as desired. Decode circuit 514 can perform any necessary decoding of the fetched instructions. In some embodiments, decoding can include converting the fetched instruction into one or more sequential microinstructions that can be delivered to functional units, including vector cumulative sum unit 502. Depending on implementation, other examples of decoding operations can include register renaming, memory address translation, memory access (e.g., to retrieve operands), etc. Dispatch circuit 516 receives decoded instructions and sends control signals to functional units 502, 504, 506 to execute the instructions, selecting the appropriate functional unit based on the particular instruction. Dispatch of instructions to functional units can proceed in order or out-of-order as desired. In some embodiments, dispatch circuit 516 can manage data dependencies so that instructions are not executed until their operands are ready. Retirement unit 518 can perform post-execution processing, such as moving output data out of output registers of the functional units, notifying dispatch circuit 516 of instruction completion, and so on. Any type of microprocessor architecture can be used, including pipelined architectures in which output data from one functional unit is provided as input data to a next functional unit in the pipeline, either directly or via a buffer.

To support operation of vector cumulative sum unit 502, the instruction set architecture of microprocessor 500 can include at least the following instructions:

(1) An initialization instruction (referred to herein as "VCS_INIT") to initialize vector cumulative sum unit 502. For example, where vector cumulative sum unit 502 includes vector cumulative sum circuit 300, the VCS_INIT instruction can include an operand that specifies a value CR to be loaded into initialization register 312. During execution of the VCS_INIT instruction, the value CR can be loaded into initialization register 312, and control signal 316 for multiplexer 314 can be set to the "reset" state so that the value CR from initialization register 312 is provided to first adder 306-0.

(2) A sum instruction (referred to herein as "VCUMSUM") to operate vector cumulative sum unit 502 to compute a cumulative sum. For example, where vector cumulative sum unit 502 includes vector cumulative sum circuit 300, the VCUMSUM instruction can include a vector operand specifying the L input values to be loaded into input registers 302. The particular mechanism for loading operands into registers 302, then triggering operation of adder circuits 306 depends on the particular architecture of microprocessor 500. The VCUMSUM instruction can also result in setting control signal 316 for multiplexer 314 to the "accumulate" state so that the output value from register 304-7 as the carry-forward input value for the next cumulative sum. (It should be understood that setting of the control signal to the "accumulate" state can occur at any point in time after operation of first adder 306-0, and that once set to the "accumulate" state, the control signal can remain in that state until the next VCS_INIT instruction is executed.

Using the VCS_INIT and VCUMSUM instructions, various digital signal processing operations can be efficiently implemented. Examples include filtering operations that are amenable to recursive computations. One example is a moving average filter as described above with reference to Eqs. (1) and (2). Ignoring the 1/M normalization, a moving average filter can be computed recursively as:

$$y[n]=y[n-1]+x[n+P]-x[n-P] \quad (4)$$

where P=M/2. Thus, if a difference vector w is defined as:

$$w[n]=x[n+P]-x[n-P] \quad (5)$$

then the moving average filter can be computed as a vector cumulative sum of the difference vector w.

Figure 6:
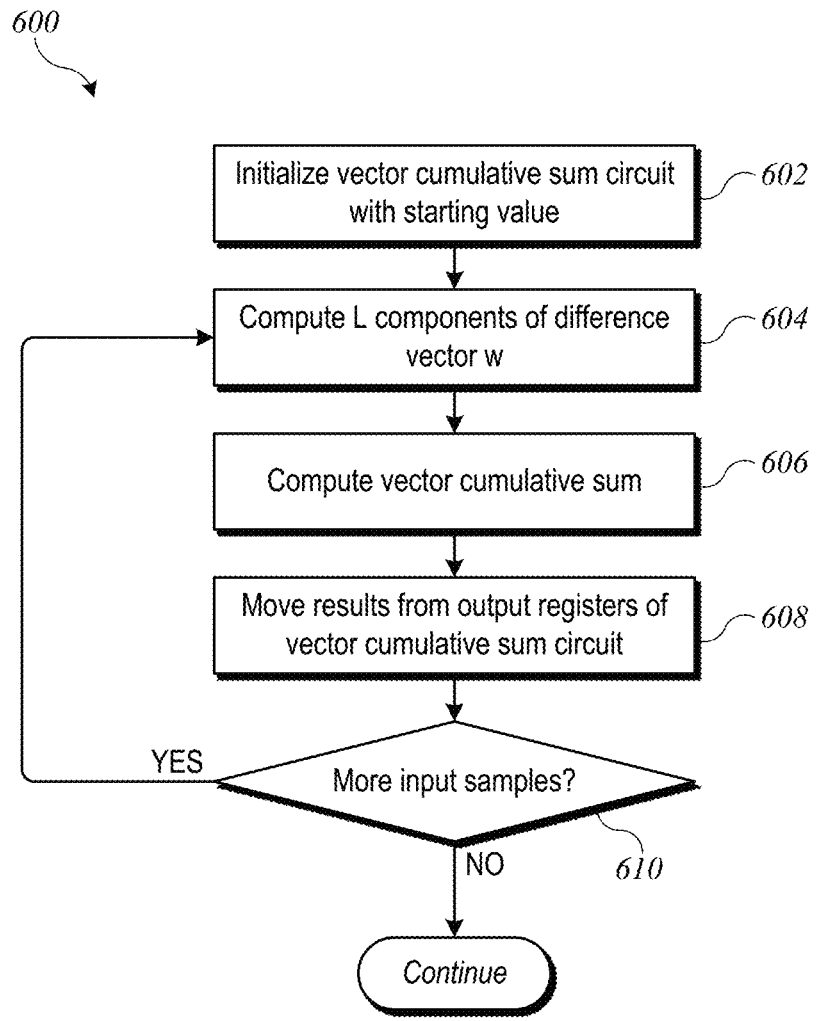
FIG. 6 is a flow diagram of a process that implements a moving average filter according to some embodiments.

FIG. 6 is a flow diagram of a process 600 that implements a moving average filter according to some embodiments.

Process 600 leverages Eqs. (4) and (5). Process 600 can be implemented, e.g., in microprocessor 500 with vector cumulative sum unit 502 incorporating circuit 300 (or circuit 400). For example, process 600 can be expressed as program instructions executable by microprocessor 500. It is assumed that an input data set x of some length (N) is available and that N can be greater than L. The length N can be but need not be specified in advance. For example, the input data set can be a digital data stream that is received and filtered in real time.

At block 602, a vector cumulative sum circuit (e.g., circuit 300) is initialized, e.g., by executing a VCS_INIT instruction as described above. The input value CR for initialization register 312 can be zero. At block 604, L components of a difference vector w can be computed, e.g., according to Eq. (5). In some embodiments, computation of L components of difference vector w can be performed using a vector difference operation in SIMD ALU 504, with the two vector operands being selected as different sets of L sequential components of the input data set x, with an appropriate (e.g., M points) offset.

At block 606, a vector cumulative sum can be computed, e.g., by executing a VCUMSUM instruction as described above, with the L components of difference vector w from block 604 as the input operands. As described above, execution of the VCUMSUM instruction produces L outputs, which are (except for normalization) the next L moving average values. At block 608, the outputs can be moved out of output registers 304 (e.g., into a memory or to other registers for use in a subsequent operation). At block 610, if more samples of the input data set x remain to be filtered, process 600 can return to block 604 to continue computing moving averages. As long as no VCS_INIT command is received, vector cumulative circuit 300 can continue to use the last result of one computation (the value in output register 306-8 in circuit 300) as the carry-forward input for the next operation so that a true running sum of components of the difference vector w is produced. Normalization of the moving average can be performed, if desired, by multiplying by 1/M, which can be done before providing the components of difference vector w to vector cumulative sum circuit 300 or after computing the cumulative sums. (For some applications of moving average filters, normalization can be omitted.) Once all input samples have been processed, process 600 can end and other processing can continue.

Using a process such as process 600, a vector cumulative sum circuit (e.g., circuit 300 or circuit 400) can compute a moving average filter of size M for a set of N input samples in approximately 2 N/L cycles. Thus, the execution time can be independent of the filter size M.

Figure 7:
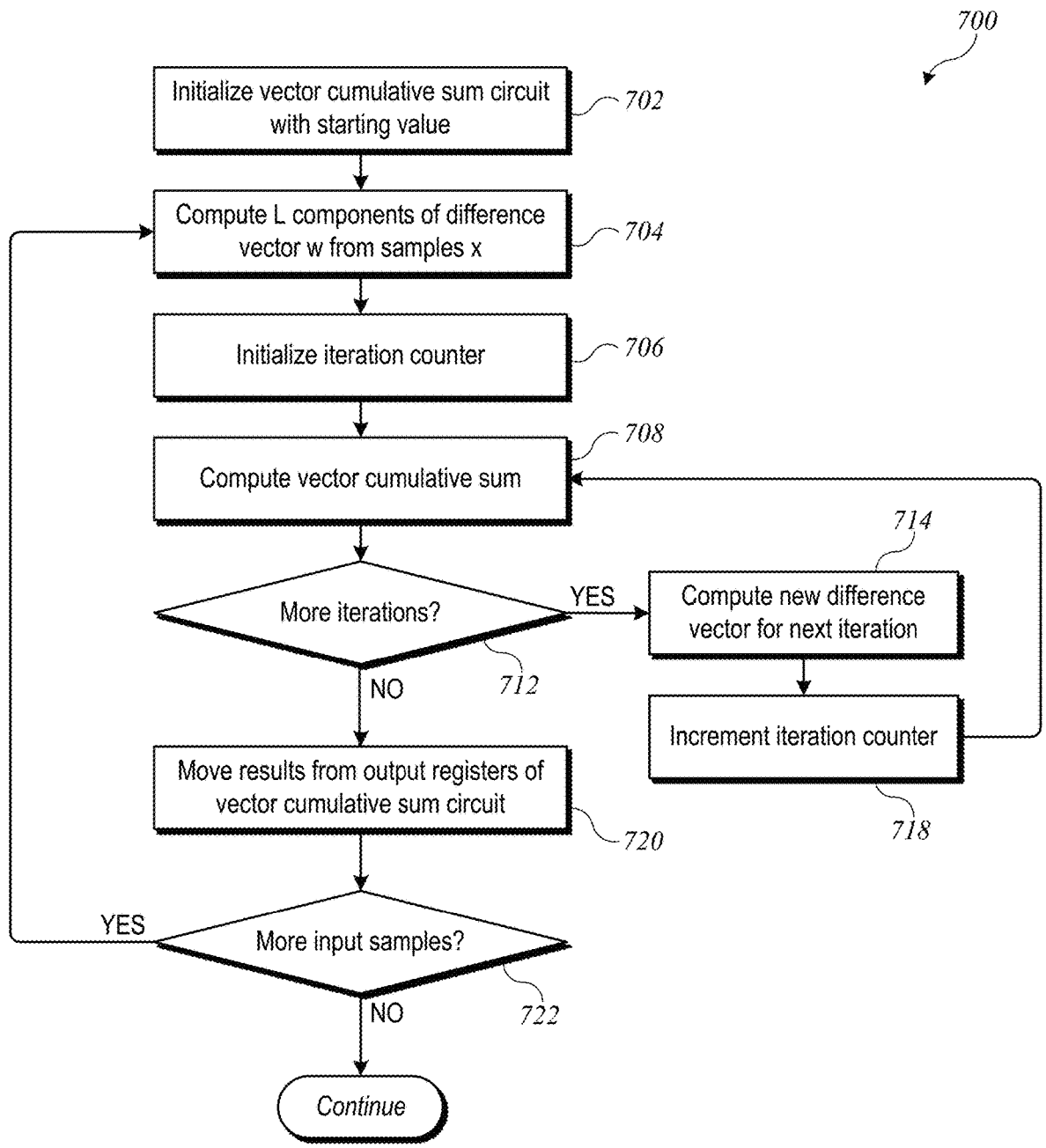
FIG. 7 is a flow diagram of a process that implements a $sinc^k$ filter according to some embodiments.

Applications of a vector cumulative sum circuit are not limited to moving average filters. As another example, a $sinc^k$ filter can be implemented by iteratively applying a moving average filter to an output of a moving average filter. FIG. 7 is a flow diagram of a process 700 that implements a $sinc^k$ filter using an iterative moving average filter according to some embodiments. Process 700 can be implemented, e.g., in microprocessor 500 with vector cumulative sum unit 502 incorporating circuit 300 (or circuit 400). For example, process 700 can be expressed as program instructions executable by microprocessor 500. It is assumed that an input data set x of some length (N) is available and that N can be greater than L. The length N can be but need not be specified in advance. For example, the input data set can be a digital data stream that is received and filtered in real time.

At block 702, a vector cumulative sum circuit (e.g., circuit 300) is initialized, e.g., by executing a VCS_INIT instruction. The input value CR for initialization register 312 can be zero. At block 704, L components of a difference vector w can be computed, e.g., according to Eq. (5). In some embodiments, computation of L components of difference vector w can be performed using a vector difference operation in SIMD ALU 504, with the two vector operands being selected as different sets of L sequential components of the input data set x, with an appropriate (e.g., M points) offset.

At block 706, an iteration counter can be initialized. The iteration counter can count a number of iterations of the vector cumulative sum operation. In the first iteration, a vector cumulative sum can be computed at block 708, e.g., using a VCUMSUM instruction with the L components of difference vector w from block 704 as the input operands. As described above, execution of the VCUMSUM instruction produces L outputs. At block 712, process 700 can determine whether more iterations of the summing operation should be performed. For instance, the iteration counter can be compared to a value k that determines the number of iterations to perform. If more iterations should be performed, then at block 714, process 700 can compute a new difference vector, using the outputs (e.g., OR[0] to OR[7]) of the last execution of the VCUMSUM instruction as the inputs, and at block 718, process 700 can increment the iteration counter. Process 700 can then return to block 708 to compute another vector cumulative sum using the new difference vector. In this manner, blocks 708, 712, 714, and 718 can be repeated for the desired number of iterations (e.g., k iterations for $sinc^k$ filter of order k). After the last iteration, at block 720, the outputs can be moved out of output registers 304 (e.g., into a memory or to other registers for use in a subsequent operation). At block 722, if more samples of the input data set x remain to be filtered, process 700 can return to block 704 to continue processing.

In this manner, a $sinc^k$ filter for any order k can be computed. In some embodiments, execution of a $sinc^k$ filter for N input samples using process 700 can take ~2 kN/L cycles. As with the moving average filter (which corresponds to the k=1 order of $sinc^k$ filter), the computation time is independent of the kernel length M Process 700 can provide significant speedup relative to a convolution-based computation, which can take ~$NM_k$/L cycles, where $M_k$=k (M−1) is the kernel length.

Another example of a class of filters that can benefit from a vector cumulative sum circuit such as circuit 300 or circuit 400 includes cascaded integrator-comb (CIC) filters. For instance, CIC decimation filters can be implemented using a cascade of integrators, followed by downsampling (decimation), then a cascade of difference filters. A vector cumulative sum circuit of the kind described herein can be used to implement the cascade of integrators (similar to the $sinc^k$ filter computation described above) while a vector difference circuit is used to implement the cascade of difference filters. The downsampling stage can be implemented using conventional vector extraction techniques. CIC interpolation filters can be implemented similarly. In some embodiments, for decimation by D, computation of a CIC filter of order k can take $$\sim \frac{N}{L}\left(k\left(1+\frac{1}{D}\right)+1\right)$$

cycles, which is significantly faster than an implementation using vector convolution.

Those skilled in the art with access to the present disclosure will appreciate that the foregoing examples of filters that can be accelerated using a vector cumulative sum circuit are illustrative and that vector cumulative sum circuits can be deployed and used in any context where a running sum of elements is of interest, including but not limited to filtering.

While specific embodiments have been described, those skilled in the art will appreciate that variations and modifications are possible. For instance, a vector cumulative sum circuit can include any number of lanes and any arrangement of adder circuits that produces a set of outputs representing a running sum of the inputs (including a carry-forward value). Data can be in any format, including fixed-point (or integer), floating-point, real values, complex values, etc. In the drawings, the arrangement of input and output registers matches the logical order of the inputs and outputs (e.g., as defined by an associated index); however, a particular physical arrangement of circuit components is not required, provided that a logical order of inputs and outputs is established.

In some embodiments, carry-forward logic of the kind described herein can be used to support multithreaded operations. For instance, when switching between threads, the sum in the last output register (e.g., output register 306-7 in circuit 300) can be saved to a context buffer associated with the thread being switched out. The saved value can be provided to the initialization register (e.g., as value CR in register 312 in circuit 300) when the thread becomes active again and can be used to compute the next vector cumulative sum. In this manner, computation of a running sum for a particular thread can continue.

In some embodiments, a circuit or functional unit can include a cascade of vector cumulative sum circuits, in which the outputs of one vector cumulative sum circuit (e.g., circuit 300 or circuit 400) are used as inputs to the next vector cumulative sum circuit in the cascade. Cascaded vector cumulative sum circuit can be used, e.g., to implement higher-order filtering operations such as $\text{sinc}^k$ filters for k>1 in a single pass (or in a smaller number of passes).

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

\*\*\*

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various embodiments may use computer program code to implement various features. Any such program code may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may include an internal storage medium of a compatible electronic device, which can be any electronic device having the capability of reading and executing the program code, and/or external storage media readable by the electronic device that can execute the code. In some instances, program code can be supplied to the electronic device via Internet download or other transmission paths.

Numerous variations and modifications will become apparent to those skilled in the art once the above disclosure is fully appreciated. It is intended that the following claims be interpreted to embrace all such variations and modifications.

What is claimed is:

1. A vector cumulative sum circuit comprising:
   a plurality of input registers having a logical order from a first input register to a last input register;
   a plurality of output registers having a logical order from a first output register to a last output register, wherein different ones of the output registers correspond to different ones of the input registers;
   a carry-forward data source configured to provide a carry-forward data value; and
   a network of adder circuits coupled between the input registers and the output registers and configured such that any given one of the output registers receives a value equal to a sum of the carry-forward data value and respective values from each of the input registers in the logical order from the first input register through the input register that corresponds to the given one of the output registers, the network of adder circuits including at least one adder circuit that receives an input value from another adder circuit in the network,
   wherein the vector cumulative sum circuit is configured to receive respective input values into the input registers concurrently and to output respective output values from the output registers concurrently.

2. The vector cumulative sum circuit of claim 1 further comprising a data transfer path coupled between the last output register and the carry-forward data source.

3. The vector cumulative sum circuit of claim 1 wherein the carry-forward data source includes:
   an initialization register; and
   a multiplexer having a first input coupled to the initialization register and a second input coupled to the last output register, the multiplexer being configured to select one of the first input or the second input as the carry-forward data value.

4. The vector cumulative sum circuit of claim 1 wherein the vector cumulative sum circuit is configured to operate in response to a set of one or more instructions.

5. The vector cumulative sum circuit of claim 4 wherein the set of one or more instructions includes:
an initialization instruction to provide an initialization value to the carry-forward data source; and
a vector cumulative sum instruction to operate the network of adder circuits and to provide the output value from the last output register to the carry-forward data source.

6. The vector cumulative sum circuit of claim 5 wherein the carry-forward data source includes a logic circuit configured such that the initialization value is provided as the carry-forward data value during a first execution of the vector cumulative sum instruction following an execution of the initialization instruction and the output value provided from the last output register is provided as the carry-forward data value during each subsequent execution of the vector cumulative sum instruction until another initialization instruction is executed.

7. The vector cumulative sum circuit of claim 1 wherein the plurality of input registers includes a number (L) of input registers, wherein L is an integer greater than or equal to 2, the plurality of output registers includes the number L of output registers, and the network of adder circuits includes the number L of adder circuits.

8. The vector cumulative sum circuit of claim 1 wherein the plurality of input registers includes a number (L) of input registers, wherein L is an integer greater than or equal to 2, the plurality of output registers includes the number L of output registers, and the network of adder circuits includes more than L adder circuits arranged such that a critical path of the network of adder circuits includes fewer than L adder circuits.

9. A microprocessor comprising:
a vector arithmetic logic circuit operable to compute a vector difference between two vectors; and
a vector cumulative sum circuit comprising:
a plurality of input registers having a logical order from a first input register to a last input register;
a plurality of output registers having a logical order from a first output register to a last output register, wherein different ones of the output registers correspond to different ones of the input registers;
a carry-forward data source configured to provide a carry-forward data value; and
a network of adder circuits coupled between the input registers and the output registers and configured such that any given one of the output registers receives a value equal to a sum of the carry-forward data value and respective values from each of the input registers in the logical order from the first input register through the input register that corresponds to the given one of the output registers, the network of adder circuits including at least one adder circuit that receives an input value from another adder circuit in the network,
wherein the vector cumulative sum circuit is configured to receive to receive respective input values into the input registers concurrently and to output respective output values from the output registers concurrently,
wherein an instruction set of the microprocessor includes a vector cumulative sum instruction that causes the vector cumulative sum circuit to operate the network of adder circuits.

10. The microprocessor of claim 9 wherein the carry-forward data source includes:
an initialization register; and
a multiplexer having a first input coupled to the initialization register and a second input coupled to the last output register, the multiplexer being configured to select one of the first input or the second input as the carry-forward data value.

11. The microprocessor of claim 10 wherein the instruction set of the microprocessor further includes an initialization instruction that causes the vector cumulative sum circuit to load an initialization value into the initialization register and set the multiplexer to a state that selects the first input as the carry-forward data value.

12. The microprocessor of claim 11 wherein the vector cumulative sum instruction further sets the multiplexer to a state that selects the second input as the carry-forward data value after operating the network of adder circuits.

13. The microprocessor of claim 9 wherein the microprocessor is configured for single-instruction multiple-data (SIMD) execution of instructions across a number (L) of parallel lanes, wherein L is an integer greater than or equal to 2, and wherein the plurality of input registers and the plurality of output registers each include L registers.

14. The microprocessor of claim 13 wherein the network of adder circuits includes more than L adder circuits arranged such that a critical path of the network of adder circuits includes fewer than L adder circuits.

15. The microprocessor of claim 9 wherein the microprocessor is configured to compute a moving-average filter for a set of input samples by executing a vector difference instruction in the vector arithmetic logic circuit followed by the vector cumulative sum instruction in the vector cumulative sum circuit.

16. The microprocessor of claim 9 wherein the microprocessor is configured to compute a $sinc^k$ filter having an order k, wherein k is a positive integer, for a set of input samples by executing a vector difference instruction in the vector arithmetic logic circuit followed by iteratively executing the vector cumulative sum instruction in the vector cumulative sum circuit for a number of iterations equal to the order k.

17. The microprocessor of claim 9 wherein the microprocessor is configured to compute an integral of a function defined by a set of input samples by executing the vector cumulative sum instruction.

18. A method comprising:
receiving, in a microprocessor, an input data set to be filtered; and
executing, by the microprocessor, a sequence of instructions to filter the input data set, wherein executing the sequence of instructions includes:
executing, using a vector arithmetic logic unit of the microprocessor, a vector difference instruction on two input vectors selected from the input data set; and
executing a vector cumulative sum instruction using a vector cumulative sum circuit that includes a plurality of input registers having a logical order from a first input register to a last input register; a plurality of output registers having a logical order from a first output register to a last output register, wherein different ones of the output registers correspond to different ones of the input registers; a carry-forward data source configured to provide a carry-forward data value; and a network of adder circuits coupled between the input registers and the output registers and configured such that any given one of the output registers receives a value equal to a sum of the carry-forward data value and respective values from each of the input registers in the logical order from the first input register through the input register that corresponds to the given one of the output registers, the network of adder circuits including at least one adder circuit that receives an input value from another adder circuit in the network, wherein a vector output of executing the vector difference instruction is loaded into the input registers of the vector cumulative sum circuit; and using the values received in the output registers as a moving average of the input data set.

19. The method of claim 18 further comprising:

repeating execution of the vector difference instruction and execution of the vector cumulative sum instruction for successive portions of the input data set, wherein for the repeated executions of the vector cumulative sum instruction, the carry-forward data value is a value received at the last output register during an immediately preceding execution.

20. The method of claim 19 further comprising:

prior to a first execution of the vector cumulative sum instruction, executing an initialization instruction that loads an initialization value into the carry-forward data source.

* * * * *